(12) United States Patent
Imagaki et al.

(10) Patent No.: US 11,383,754 B2
(45) Date of Patent: Jul. 12, 2022

(54) STEERING SYSTEM

(71) Applicant: JTEKT CORPORATION, Osaka (JP)

(72) Inventors: Susumu Imagaki, Tondabayashi (JP);
Masayoshi Sakuda, Kashihara (JP);
Kota Higuchi, Hamamatsu (JP);
Kazuki Fujiwara, Toyohashi (JP);
Kenji Utsunomiya, Toyohashi (JP);
Takuya Adachi, Toyohashi (JP)

(73) Assignee: JTEKT CORPORATION, Kariya (JP)

( * ) Notice: Subject to any disclaimer, the term of this patent is extended or adjusted under 35 U.S.C. 154(b) by 0 days.

(21) Appl. No.: 17/172,272

(22) Filed: Feb. 10, 2021

(65) Prior Publication Data

US 2021/0253156 A1    Aug. 19, 2021

(30) Foreign Application Priority Data

Feb. 14, 2020    (JP) .............................. JP2020-023581

(51) Int. Cl.
*B62D 1/184* (2006.01)
*B62D 1/185* (2006.01)
*B62D 1/19* (2006.01)

(52) U.S. Cl.
CPC ............. *B62D 1/184* (2013.01); *B62D 1/185* (2013.01); *B62D 1/192* (2013.01)

(58) Field of Classification Search
CPC ........ B62D 1/184; B62D 1/185; B62D 1/192; B62D 1/195
See application file for complete search history.

(56) References Cited

U.S. PATENT DOCUMENTS

| 5,537,890 A * | 7/1996 | Thomas | B62D 1/184 |
|---|---|---|---|
| | | | 280/775 |
| 9,849,905 B2 * | 12/2017 | Anspaugh | B62D 1/184 |
| 2011/0156380 A1 | 6/2011 | Dietz et al. | |
| 2015/0375771 A1 | 12/2015 | Tinnin et al. | |
| 2018/0222520 A1 | 8/2018 | Nagatani et al. | |

FOREIGN PATENT DOCUMENTS

| EP | 3124355 A2 * | 2/2017 | ............. B62D 1/185 |
|---|---|---|---|
| JP | 2018-127062 A | 8/2018 | |
| JP | 2018-165108 A | 10/2018 | |
| WO | 2010/022855 A1 | 3/2010 | |

OTHER PUBLICATIONS

Jun. 30, 2021 Search Report issued in European Patent Application No. 21156554.4.

* cited by examiner

*Primary Examiner* — Drew J Brown
(74) *Attorney, Agent, or Firm* — Oliff PLC

(57) ABSTRACT

A steering system includes an upper jacket, a lower jacket, a support, a lock mechanism, and a shock absorber. The support supports the lower jacket. The lock mechanism switches a restriction of a telescopic adjustment and a termination of the restriction. The upper jacket includes a protruding stopper configured to regulate a position of the upper jacket at one end of a telescopic stroke range. The lock mechanism includes an opening and closing portion configured to enter a path of the stopper while the restriction of the telescopic adjustment is terminated, and configured to open the path of the stopper while the telescopic adjustment is restricted.

7 Claims, 10 Drawing Sheets

STEERING SYSTEM

CROSS-REFERENCE TO RELATED APPLICATION

This application claims priority to Japanese Patent Application No. 2020-023581 filed on Feb. 14, 2020, incorporated herein by reference in its entirety.

BACKGROUND

1. Technical Field

The present disclosure relates to a steering system.

2. Description of Related Art

A steering system including an upper jacket, a lower jacket, and a support is disclosed (see, for example, Japanese Unexamined Patent Application Publication No. 2018-127062 (JP 2018-127062 A)). A steering member is connected to one end of the upper jacket in a column axis direction. The lower jacket is externally fitted to the other end of the upper jacket in a slidable manner. The support is fixed to a vehicle body, and supports the lower jacket. This steering system includes a shock absorbing mechanism for moving the upper jacket relative to the lower jacket upon secondary collision caused by collision of the vehicle. The shock absorbing mechanism absorbs a shock of the secondary collision.

SUMMARY

The upper jacket has a stopper configured to restrict a further movement of the upper jacket by abutting against a part of the lower jacket at the time of adjusting a telescopic position. When the stopper interferes with the lower jacket upon secondary collision, shock energy absorption is hindered.

The present disclosure provides a steering system in which a decrease in shock energy absorption due to a stopper can be suppressed.

A steering system according to an aspect of the present disclosure includes an upper jacket, a lower jacket, a support, a lock mechanism, and a shock absorber. A steering member is connected to the upper jacket at one end in a column axis direction. The lower jacket is externally fitted to the other end of the upper jacket in the column axis direction in a slidable manner. The support is fixed to a vehicle body, and supports the lower jacket. The lock mechanism is configured to switch a restriction of a telescopic adjustment of the upper jacket relative to the lower jacket and a termination of the restriction. The shock absorber is configured to absorb a shock when the upper jacket moves relative to the lower jacket upon secondary collision. The upper jacket includes a stopper having a protruding shape and configured to regulate a position of the upper jacket at one end of a telescopic stroke range. The lock mechanism includes an opening and closing portion configured to enter a path of the stopper while the restriction of the telescopic adjustment is terminated, and configured to open the path of the stopper while the telescopic adjustment is restricted.

In the steering system according to the present disclosure, the decrease in the shock energy absorption due to the stopper can be suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiments of the present disclosure are described below in detail with reference to the accompanying drawings.

First Embodiment

Figure 1:
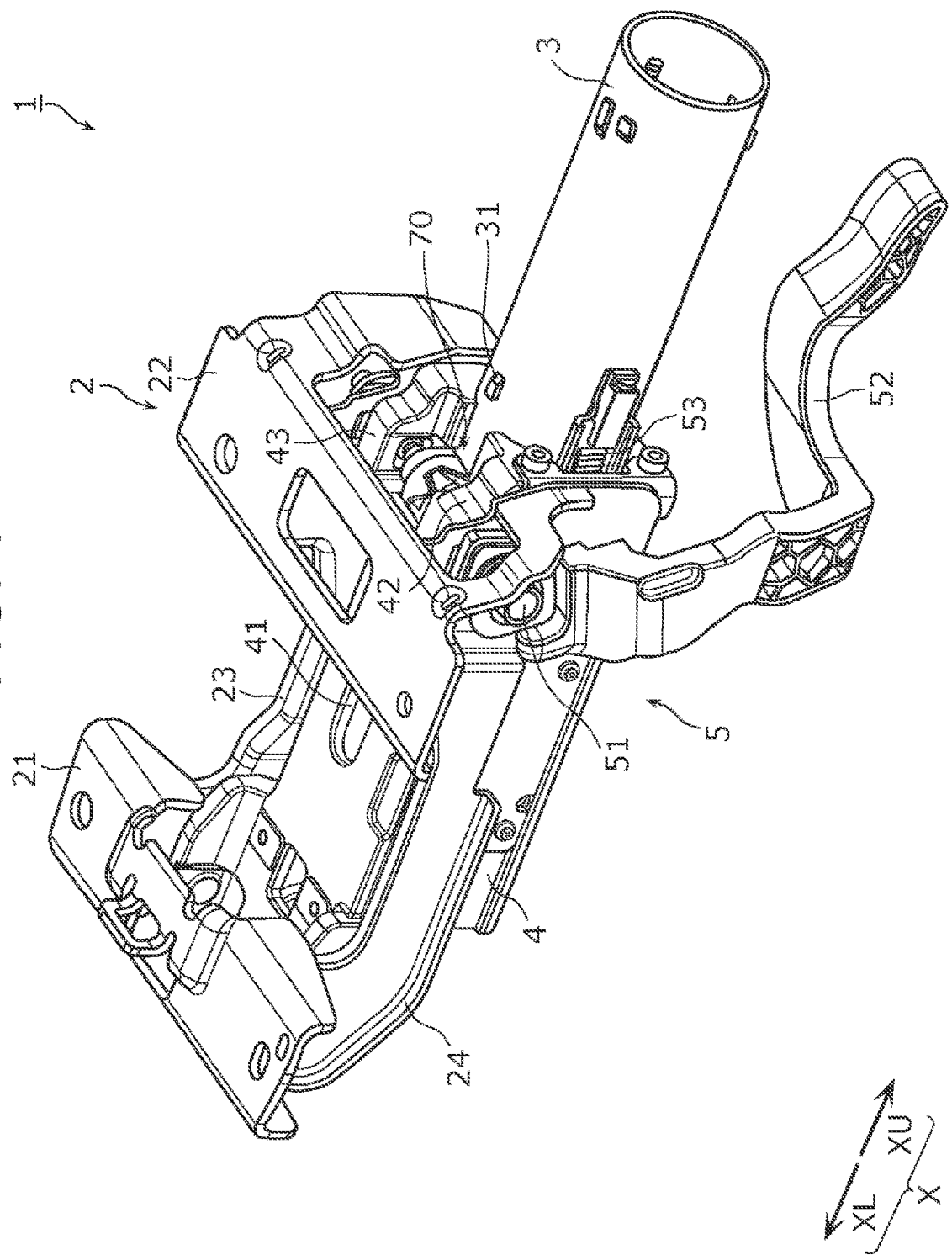
FIG. 1 is a perspective view illustrating the overall structure of a steering system according to a first embodiment.
Figure 2:
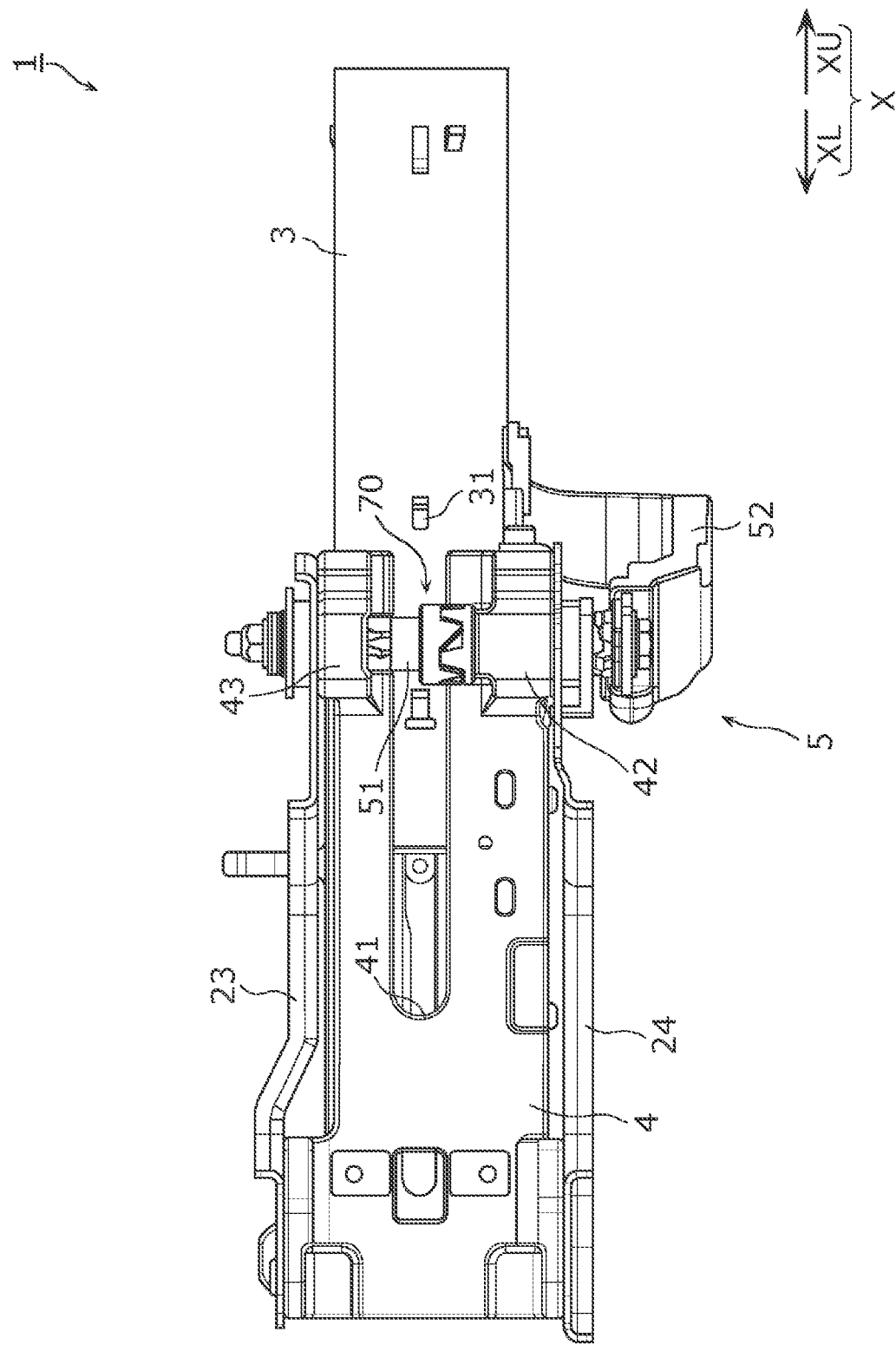
FIG. 2 is a top view illustrating the overall structure of the steering system according to the first embodiment.

FIG. 1 is a perspective view illustrating the overall structure of a steering system 1 according to a first embodiment. FIG. 2 is a top view illustrating the overall structure of the steering system 1 according to the first embodiment. In FIG. 2, illustration of a pair of brackets 21 and 22 of a support 2 is omitted.

Structure

As illustrated in FIG. 1 and FIG. 2, the steering system 1 includes the support 2, an upper jacket 3, a lower jacket 4, a lock mechanism 5, and a shock absorber 6. The steering system 1 further includes a steering shaft (not illustrated) housed in the upper jacket 3 and the lower jacket 4. The steering system 1 turns steered wheels (not illustrated) in association with steering of a steering member (steering wheel: not illustrated) coupled to one end of the steering shaft. The steered wheels and the steering shaft are coupled together via an intermediate shaft and a steering operation mechanism.

An upper side in a column axis direction X that is an axial direction of the steering shaft is hereinafter referred to as "axial direction upper side XU", and a lower side in the column axis direction X is hereinafter referred to as "axial direction lower side XL". In this embodiment, the axial direction upper side XU may be referred to as "rear side", and the axial direction lower side XL may be referred to as "front side".

The support 2 is fixed to a vehicle body, and supports the lower jacket 4. The support 2 includes the brackets 21 and 22 and a pair of beams 23 and 24. The brackets 21 and 22 are arranged away from each other by a predetermined distance in the column axis direction X. The beams 23 and 24 are interposed between the brackets 21 and 22. The brackets 21 and 22 are fixed to the vehicle body. The beams 23 and 24 are fixed to right and left ends of the brackets 21 and 22.

The upper jacket 3 is a cylindrical member to which the steering member is connected at one end (end on the axial direction upper side XU) via the steering shaft. A protruding stopper 31 is provided on the outer peripheral surface of the center of the upper jacket 3. The stopper 31 regulates a position of the upper jacket 3 at one end of a telescopic stroke range.

The lower jacket 4 is a member externally fitted to the other end of the upper jacket 3 (end on the axial direction lower side XL) in a slidable manner. The other end of the lower jacket 4 is supported between the other ends of the beams 23 and 24 to be rotatable about a tilt shaft (not illustrated). Therefore, the lower jacket 4, the upper jacket 3, and the steering shaft are pivotable in a tilt direction (substantial up-and-down direction) about the tilt shaft. By pivoting the lower jacket 4, the upper jacket 3, and the steering shaft about the tilt shaft, the position of the steering member can be adjusted in the tilt direction. Thus, the steering system 1 has a tilt adjustment function.

A cutout 41 is formed at one end of an upper part of the lower jacket 4. The cutout 41 is elongated along the column axis direction X. When the upper jacket 3 slides relative to the lower jacket 4, the stopper 31 of the upper jacket 3 moves along the column axis direction X in the cutout 41.

A pair of shaft supports 42 and 43 is formed at one end of the lower jacket 4 across the cutout 41. A bolt 51 that is a part of the lock mechanism 5 is supported on the shaft supports 42 and 43.

The lock mechanism 5 switches restriction of telescopic adjustment of the upper jacket 3 relative to the lower jacket 4 and termination of the restriction. The telescopic adjustment is adjustment of the position of the steering member in the column axis direction X through extension or contraction involving a slide of the upper jacket 3 relative to the lower jacket 4. Therefore, the steering shaft is also extensible and contractible along the column axis direction X. The telescopic stroke range is a movable range of the upper jacket 3 at the time of telescopic adjustment. Specifically, the telescopic stroke range is a range between an upper limit adjustment position of the upper jacket 3 in the column axis direction X and a lower limit adjustment position of the upper jacket 3 in the column axis direction X. The entire jacket is most extended when the upper jacket 3 is at the upper limit adjustment position. The entire jacket is most contracted when the upper jacket 3 is at the lower limit adjustment position. When the upper jacket 3 reaches the position at one end of the telescopic stroke range (lower limit adjustment position), the stopper 31 of the upper jacket 3 restricts a further movement of the upper jacket 3 by abutting against a part of the lock mechanism 5.

Figure 3:
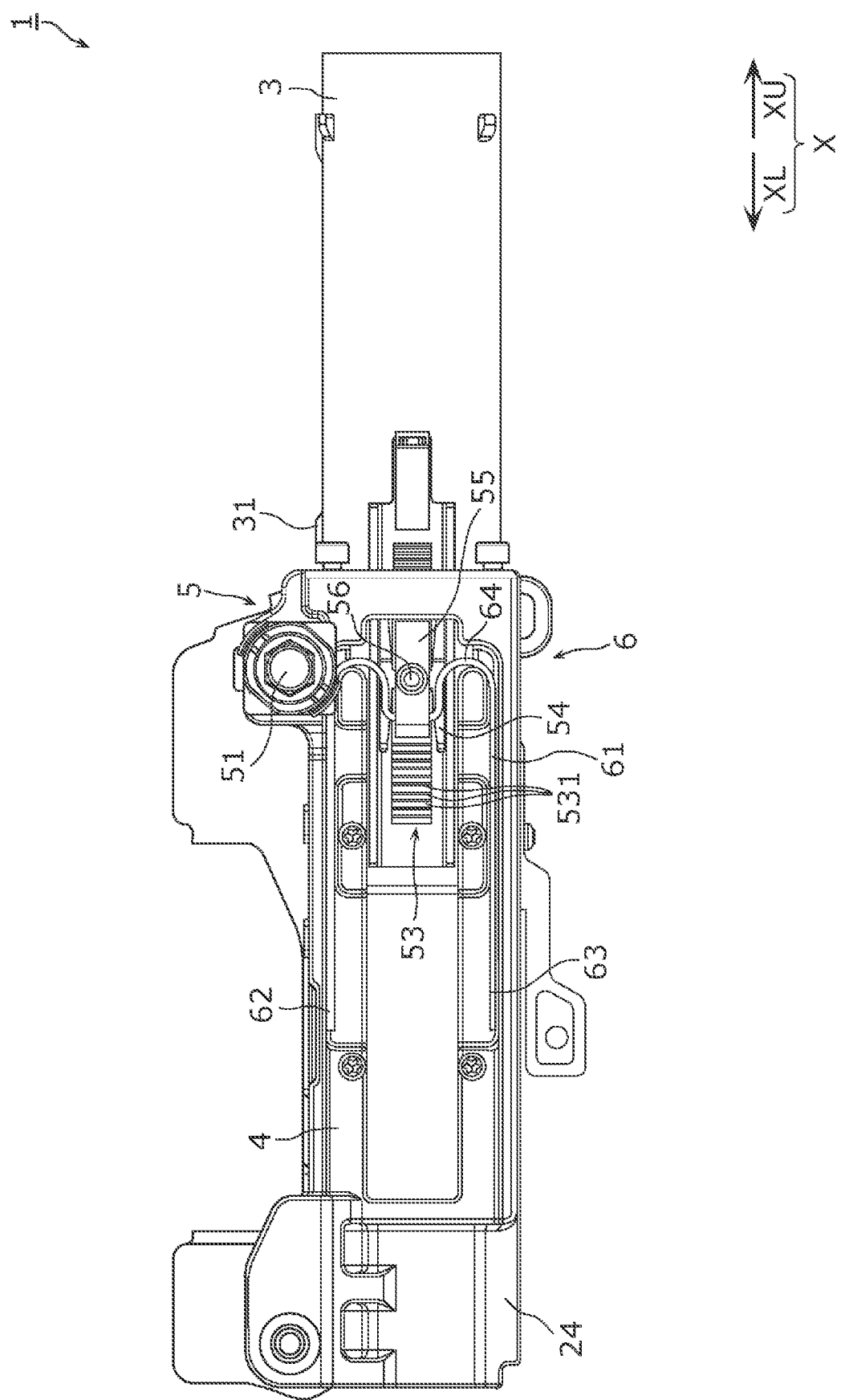
FIG. 3 is a side view illustrating the overall structure of a lock mechanism according to the first embodiment.

The lock mechanism 5 is described below in detail. FIG. 3 is a side view illustrating the overall structure of the lock mechanism 5 according to the first embodiment. Specifically, FIG. 3 is a side view of the lower jacket 4. In FIG. 3, an operation lever 52, the brackets 21 and 22, and the like are omitted.

As illustrated in FIG. 1 to FIG. 3, the lock mechanism 5 includes the bolt 51, the operation lever 52, a lock plate 53, a flat spring 54, an engagement portion 55, an urging portion 56, and an opening and closing portion 70. The operation lever 52 is used for rotating the bolt 51.

The bolt 51 is a tightening shaft supported by the shaft supports 42 and 43, and rotates in association with an operation for the operation lever 52. When the bolt 51 rotates forward, the shaft supports 42 and 43 are tightened. When the bolt 51 rotates in reverse, the shaft supports 42 and 43 are released. For example, when the operation lever 52 is operated to a locking position, the shaft supports 42 and 43 are tightened to restrict the telescopic adjustment. When the operation lever 52 is operated to an unlocking position, the shaft supports 42 and 43 are released to terminate the restriction of the telescopic adjustment. The opening and closing portion 70 also operates in association with the rotation of the bolt 51, but details of the opening and closing portion 70 are described later. Although details are omitted, the lock mechanism 5 restricts the tilt adjustment when the telescopic adjustment is restricted, and terminates the restriction of the tilt adjustment when the restriction of the telescopic adjustment is terminated.

The lock plate 53 is an elongated plate, and is arranged along the column axis direction X while being fixed to the outer peripheral surface of the upper jacket 3. The lock plate 53 has a plurality of lugs 531 formed along its longitudinal direction.

The flat spring 54 has a substantial H-shape, and is arranged between the lock plate 53 and the engagement portion 55. The flat spring 54 urges the engagement portion 55 away from the lock plate 53.

The engagement portion 55 is a member engageable with the lugs 531 of the lock plate 53. Specifically, the engagement portion 55 overlaps the lock plate 53. At least one protrusion (not illustrated) engageable with the lugs 531 is provided on the surface of the engagement portion 55 facing the lock plate 53. Further, a groove (not illustrated) to which a wire 61 described later is attached is formed on the surface of the engagement portion 55 facing the lock plate 53.

The urging portion 56 is a member configured to apply an urging force to the engagement portion 55 toward the lock plate 53. The urging force of the urging portion 56 to be applied to the engagement portion 55 varies in association with an operation for the operation lever 52. For example, when the operation lever 52 is operated to the locking position, the urging force of the urging portion 56 is greater than the urging force of the flat spring 54, and therefore the protrusion of the engagement portion 55 engages with the lugs 531 of the lock plate 53. The telescopic adjustment is restricted also through this engagement. When the operation lever 52 is operated to the unlocking position, the urging force of the urging portion 56 is smaller than the urging force of the flat spring 54, and therefore the protrusion of the engagement portion 55 moves away from the lugs 531 of the lock plate 53. Thus, the restriction of the telescopic adjustment is terminated. Since the lugs 531 of the lock plate 53 are arranged in its longitudinal direction, the telescopic position of the upper jacket 3 can be adjusted stepwise.

The shock absorber 6 absorbs a shock when the upper jacket 3 moves relative to the lower jacket 4 upon secondary collision. As illustrated in FIG. 3, the shock absorber 6 includes the lock plate 53, the flat spring 54, the engagement portion 55, the urging portion 56, and the wire 61.

The wire 61 is a member for absorbing a shock of secondary collision. The wire 61 is formed by bending a metal wire rod. Specifically, the wire 61 has a pair of ends 62 and 63 and a middle portion 64 between the two ends 62 and 63. The ends 62 and 63 are linearly formed in parallel, and are fixed to the lower jacket 4.

The middle portion 64 is a bent portion, and is partially attached to the groove of the engagement portion 55. Specifically, the middle portion 64 is bent into a substantial W-shape, and the center of the middle portion 64 is attached to the groove of the engagement portion 55. In the event of secondary collision, the upper jacket 3 enters the lower jacket 4 (moves to the axial direction lower side XL). At this time, the telescopic adjustment is restricted, but the upper jacket 3 moves against the restriction due to a shock of the secondary collision. During this movement, the protrusion of the engagement portion 55 keeps engagement with the lugs 531 of the lock plate 53, and the engagement portion 55 also moves to the axial direction lower side XL in association with the movement of the upper jacket 3 while deforming the wire 61. The shock of the secondary collision is absorbed through the deformation of the wire 61.

Next, the opening and closing portion 70 is described in detail. The opening and closing portion 70 enters a path of the stopper 31 while the restriction of the telescopic adjustment is terminated, and opens the path of the stopper 31 while the telescopic adjustment is restricted.

Figure 4:
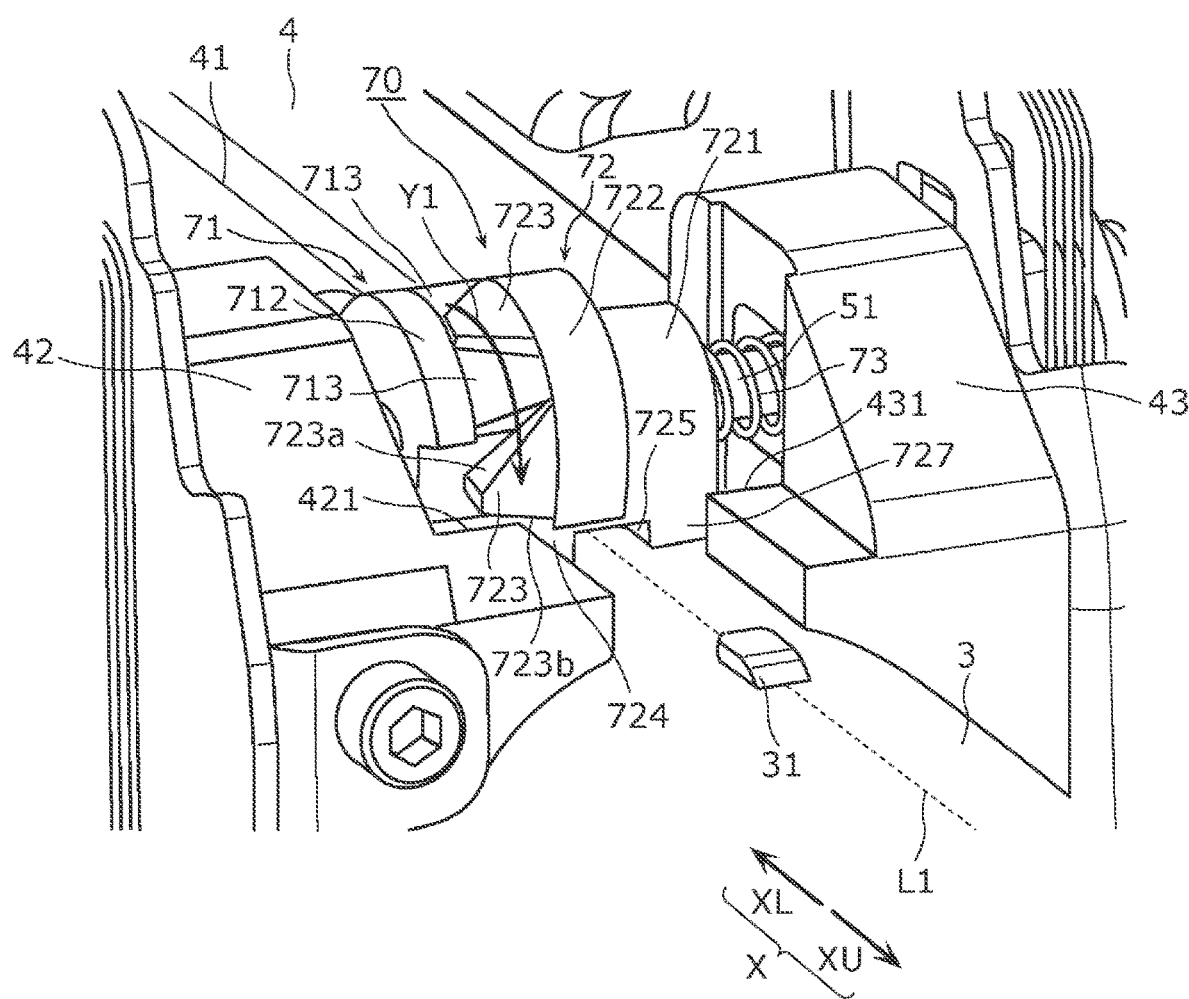
FIG. 4 is a perspective view illustrating the overall structure of an opening and closing portion according to the first embodiment.

FIG. 4 is a perspective view illustrating the overall structure of the opening and closing portion 70 according to the first embodiment. FIG. 4 illustrates the opening and closing portion 70 in a state in which the telescopic adjustment is restricted. As illustrated in FIG. 4, the opening and closing portion 70 includes the bolt 51, a pair of stopper members 71 and 72, and an urging member 73.

Of the stopper members 71 and 72, the first stopper member 71 is fitted to the bolt 51, and rotates together with the bolt 51. Of the stopper members 71 and 72, the second stopper member 72 is attached to the bolt 51 in a slidable manner. Specifically, the first stopper member 71 and the second stopper member 72 are arranged around the bolt 51 immediately above the upper jacket 3 so that the first stopper member 71 is located closer to the operation lever 52 than is the second stopper member 72.

Figure 5:
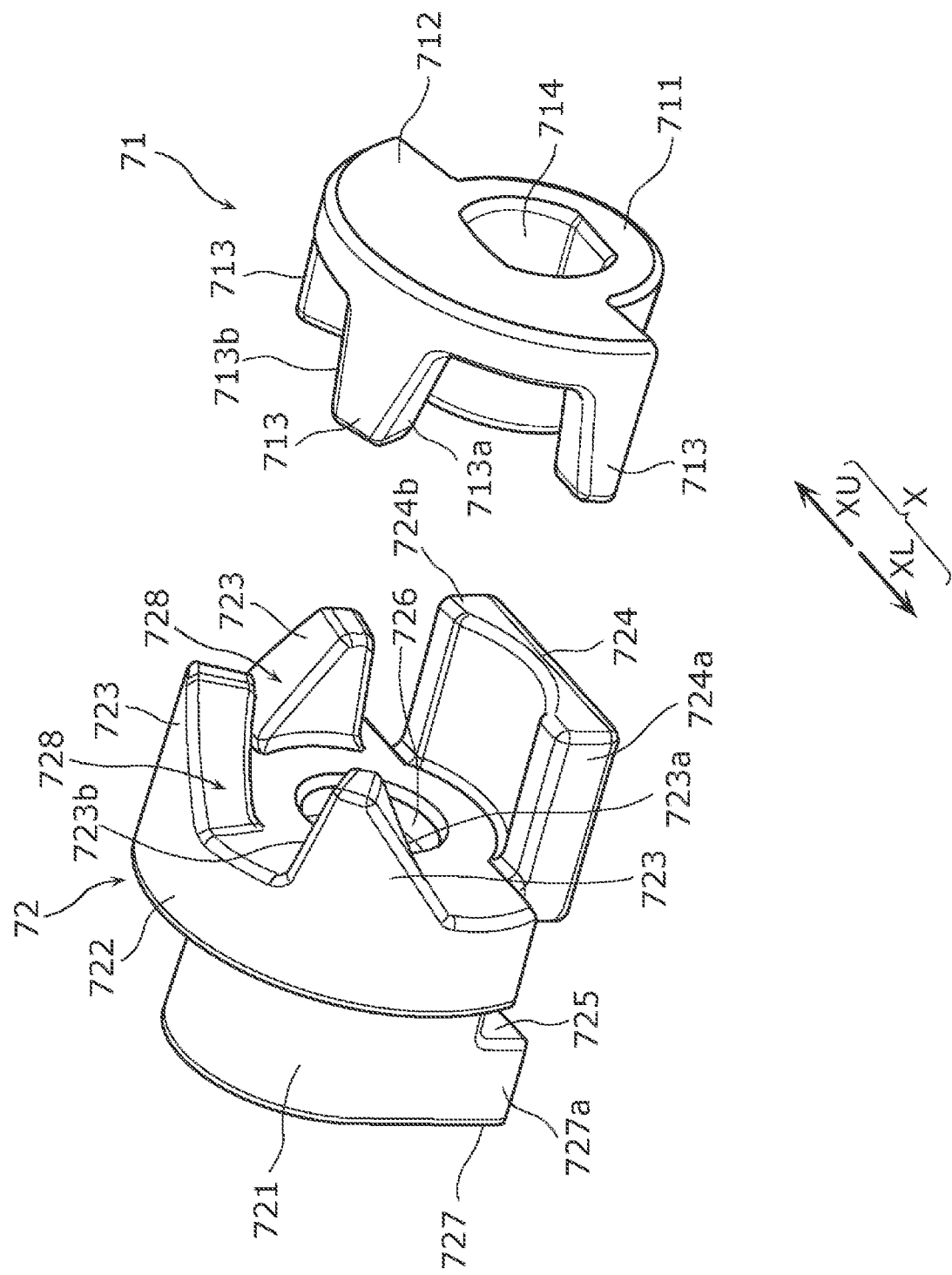
FIG. 5 is a perspective view illustrating the overall structures of a first stopper member and a second stopper member according to the first embodiment.
Figure 6:
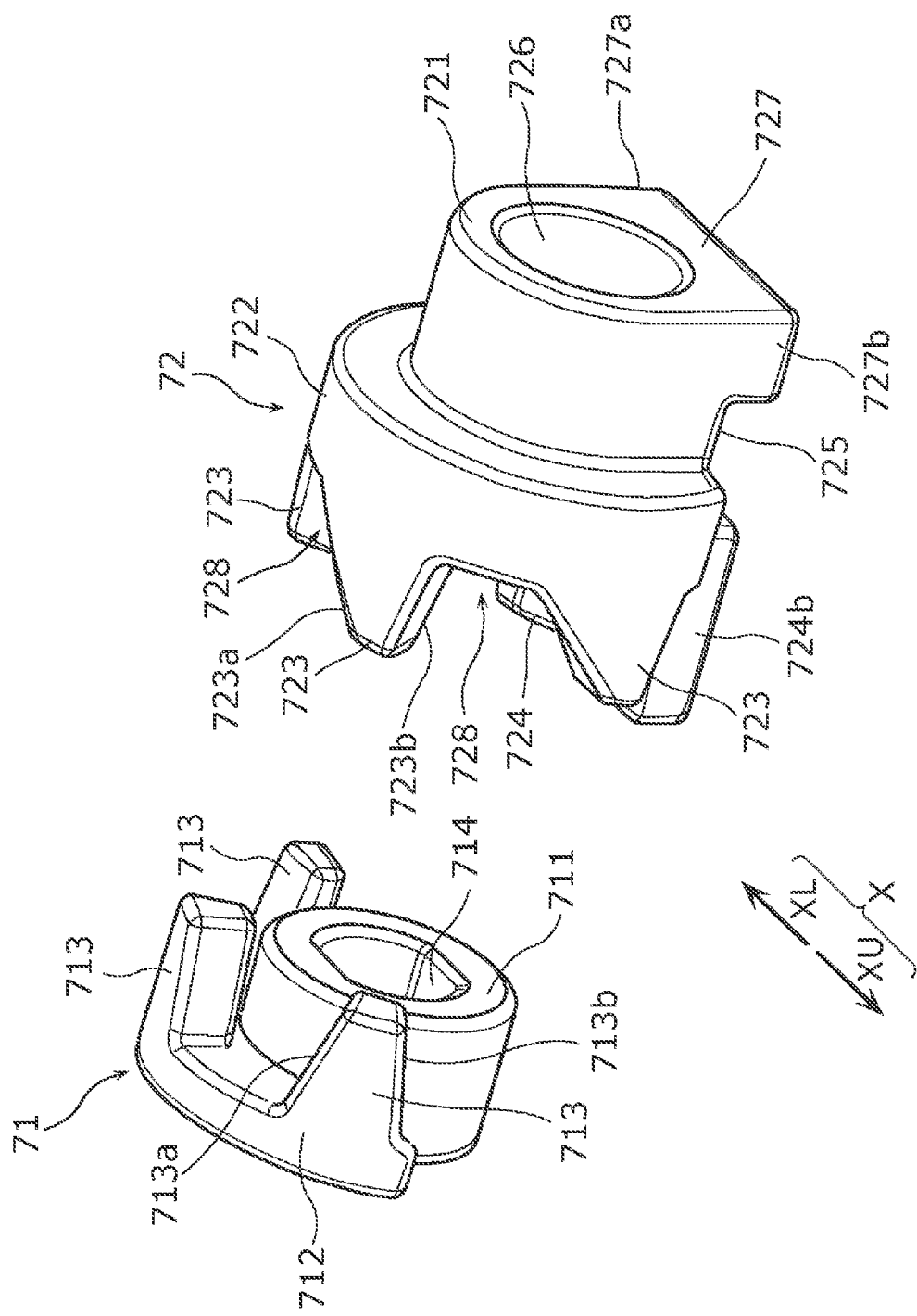
FIG. 6 is a perspective view illustrating the overall structures of the first stopper member and the second stopper member according to the first embodiment.
Figure 7:
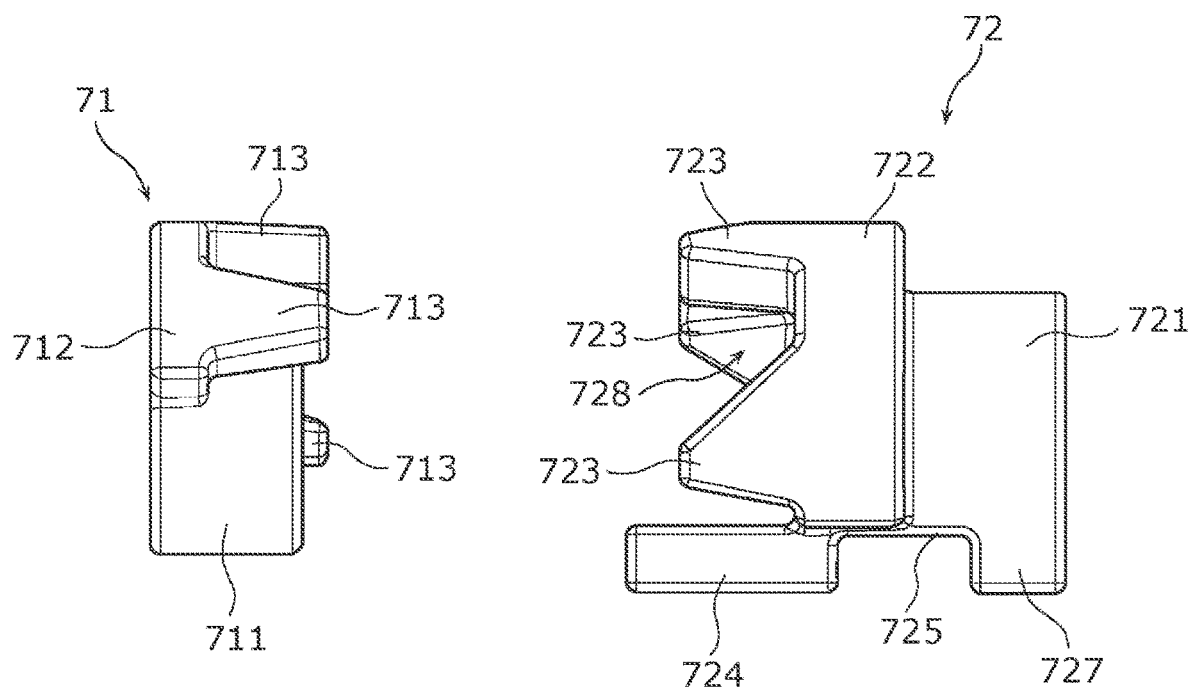
FIG. 7 is a plan illustrating the overall structures of the first stopper member and the second stopper member according to the first embodiment.

The first stopper member 71 and the second stopper member 72 are described in detail. FIG. 5 is a perspective view illustrating the overall structures of the first stopper member 71 and the second stopper member 72 according to the first embodiment. FIG. 6 is a perspective view illustrating the overall structures of the first stopper member 71 and the second stopper member 72 according to the first embodiment. FIG. 7 is a plan illustrating the overall structures of the first stopper member 71 and the second stopper member 72 according to the first embodiment. FIG. 5 is a perspective view from the axial direction lower side XL. FIG. 6 is a perspective view from the axial direction upper side XU. FIG. 7 is a plan that is viewed from the axial direction upper side XU in the column axis direction X.

As illustrated in FIG. 5 to FIG. 7, the first stopper member 71 is a resin or metal member including a first body 711, a first rib 712, and a plurality of first protrusions 713.

The first body 711 is a tubular portion, and a first through hole 714 is formed at its center to extend through the first body 711 in a direction perpendicular to the column axis direction X. The first through hole 714 has an oval shape when viewed in an axial direction, and the bolt 51 is fitted to the first through hole 714. Therefore, the first body 711 is fixed to the bolt 51. Thus, the first stopper member 71 rotates in association with the rotation of the bolt 51 without changing a relative positional relationship with the bolt 51 in the axial direction.

The first rib 712 projects outward from the outer peripheral surface of the first body 711, and extends in a circumferential direction. The first rib 712 is provided only on an upper half of the perimeter of the first body 711.

The first protrusions 713 protrude from the principal surface of the first rib 712 close to the second stopper member 72. The first protrusions 713 are arrayed at predetermined intervals in the circumferential direction. This embodiment is directed to an exemplary case where three first protrusions 713 are provided, but at least one first protrusion 713 may be provided. Each first protrusion 713 has a tapered shape. A pair of outer surfaces 713a and 713b of each first protrusion 713 located opposite to each other in the circumferential direction has a planar or smoothly curved shape.

The second stopper member 72 is a resin or metal member including a second body 721, a second rib 722, a plurality of second protrusions 723, a guide 724, and a groove 725.

The second body 721 is a tubular portion, and a second through hole 726 is formed at its center to extend through the second body 721 in a direction perpendicular to the column axis direction X. The second through hole 726 has a circular shape when viewed in an axial direction, and the bolt 51 is inserted through the second through hole 726 to be rotatable and slidable in the axial direction. A base 727 is provided at a lower part of the second body 721 to project outward. A pair of outer surfaces 727a and 727b of the base 727 located opposite to each other in the column axis direction X is flat surfaces parallel to a plane orthogonal to the column axis direction X.

As illustrated in FIG. 4, the base 727 engages with the shaft support 43 distant from the operation lever 52 out of the shaft supports 42 and 43 of the lower jacket 4. Specifically, the shaft support 43 has a first housing recess 431 that houses the base 727 in a slidable manner. A pair of inner surfaces of the first housing recess 431 facing each other in the column axis direction X is flat surfaces parallel to a plane orthogonal to the column axis direction X. The outer surfaces 727a and 727b of the base 727 are abuttable against the inner surfaces of the first housing recess 431. When the outer surfaces 727a and 727b of the base 727 abut against the inner surfaces of the first housing recess 431, rotation of the second stopper member 72 is restricted. When the second stopper member 72 slides in an axial direction of the bolt 51, the slide is guided by the inner surfaces of the first housing recess 431.

As illustrated in FIG. 5 to FIG. 7, the second rib 722 projects outward from the outer peripheral surface of the second body 721, and extends in a circumferential direction. The second rib 722 is provided at a part except the lower end of the second body 721.

The second protrusions 723 protrude from the principal surface of the second rib 722 close to the first stopper member 71. The second protrusions 723 are arrayed at predetermined intervals in the circumferential direction. A part between a pair of adjacent second protrusions 723 may be regarded as a recess 728. The first protrusion 713 meshes with each recess 728. This embodiment is directed to an exemplary case where three second protrusions 723 are provided. Therefore, two recesses 728 are provided. That is, one first protrusion 713 meshes with each recess 728, and one remaining first protrusion 713 is not positioned in the recess 728. The remaining first protrusion 713 meshes with a second protrusion 723 located at one end among the plurality of second protrusions 723. At least one recess 728 may be provided.

Each second protrusion 723 has a tapered shape. A pair of outer surfaces 723a and 723b of each second protrusion 723 located opposite to each other in the circumferential direction has a planar or smoothly curved shape. When the first stopper member 71 rotates, each first protrusion 713 of the first stopper member 71 rotates while abutting against the outer surface 723a of the second protrusion 723. At this time, the rotation is smooth because each outer surface 723a has the planar or smoothly curved shape.

The guide 724 is a plate-shaped portion projecting from the lower end of the second body 721 toward the first stopper member 71. The first body 711 of the first stopper member 71 is placed on the upper surface of the guide 724. The upper surface of the guide 724 is a smooth concave surface, and guides rotation of the first body 711. A pair of outer surfaces 724a and 724b of the guide 724 located opposite to each other in the column axis direction X is flat surfaces parallel to a plane orthogonal to the column axis direction X.

As illustrated in FIG. 4, the guide 724 engages with the shaft support 42 close to the operation lever 52 out of the shaft supports 42 and 43 of the lower jacket 4. Specifically, the shaft support 42 has a second housing recess 421 that houses the guide 724 in a slidable manner. A pair of inner surfaces of the second housing recess 421 facing each other in the column axis direction X is flat surfaces parallel to a plane orthogonal to the column axis direction X. The outer surfaces 724a and 724b of the guide 724 are abuttable against the inner surfaces of the second housing recess 421. When the outer surfaces 724a and 724b of the guide 724 abut against the inner surfaces of the second housing recess 421, rotation of the second stopper member 72 is restricted. When the second stopper member 72 slides in the axial direction of the bolt 51, the slide is guided by the inner surfaces of the second housing recess 421.

The groove 725 is formed on the lower surface of the second body 721, and extends along the column axis direction X. The groove 725 is provided between the base 727 and the guide 724, and extends through the second body 721 along the column axis direction X. In plan view, the groove 725 is shaped larger than the stopper 31 of the upper jacket 3. In a state in which the groove 725 enters a path L1 of the stopper 31, the stopper 31 can pass through the groove 725.

As illustrated in FIG. 4, the urging member 73 urges the second stopper member 72 with a force in a direction in which the second stopper member 72 approaches the first stopper member 71. Specifically, the urging member 73 is a coil spring through which the bolt 51 is inserted. The urging member 73 is interposed between the shaft support 43 and the second stopper member 72, and urges the second stopper member 72 with a force in a direction in which the second stopper member 72 moves away from the shaft support 43. That is, the second stopper member 72 is urged by the urging member 73 with the force in the direction in which the second stopper member 72 approaches the first stopper member 71. The urging member 73 may be a spring other than the coil spring, or may be an elastic member such as rubber.

Operations

Figure 8:
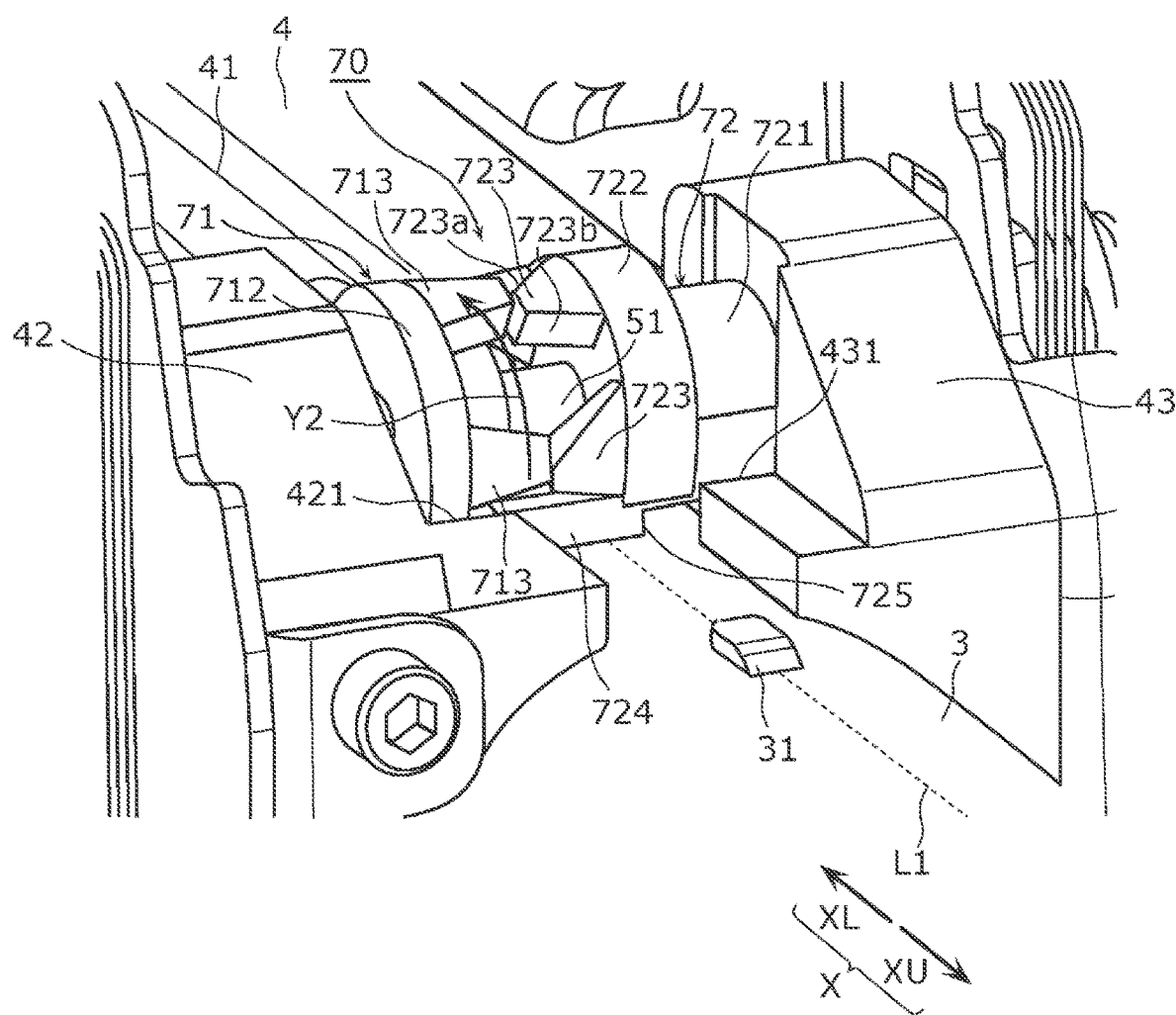
FIG. 8 is a perspective view illustrating the overall structure of the opening and closing portion according to the first embodiment.

Next, operations of the opening and closing portion 70 are described with reference to FIG. 4 and FIG. 8. FIG. 8 is a perspective view illustrating the overall structure of the opening and closing portion 70 according to the first embodiment. FIG. 8 illustrates the opening and closing portion 70 in a state in which the restriction of the telescopic adjustment is terminated.

In the state in which the telescopic adjustment is restricted as illustrated in FIG. 4, a part of the second stopper member 72 enters the first stopper member 71. Specifically, the first protrusions 713 of the first stopper member 71 are positioned in the recesses 728 of the second stopper member 72. At this time, the groove 725 of the second stopper member 72 is positioned on the path L1 of the stopper 31 of the upper jacket 3. In this state, the stopper 31 passes through the groove 725 even if the upper jacket 3 moves to the axial direction lower side XL to enter the lower jacket 4 in the event of secondary collision. Therefore, the stopper 31 does not interfere with the opening and closing portion 70.

The operation lever 52 is operated to terminate the restriction of the telescopic adjustment illustrated in FIG. 4. Specifically, when the operation lever 52 is operated and the bolt 51 rotates in an arrow Y1 direction, the first stopper member 71 rotates in the same direction. Through this rotation, the first protrusions 713 rotate as well. At this time, each first protrusion 713 slides along one outer surface 723a of each second protrusion 723 of the second stopper member 72 to push the second stopper member 72 against the urging force of the urging member 73. Through the push, the second stopper member 72 slides in the axial direction of the bolt 51. Each first protrusion 713 moves away from each recess 728 of the second stopper member 72. As illustrated in FIG. 8, the first protrusion 713 eventually disengages from the recess 728, and the distal end face of the first protrusion 713 abuts against the distal end face of the second protrusion 723. In this state, the groove 725 retreats from the path L1 of the stopper 31, and the guide 724 enters the path L1. In this state, the restriction of the telescopic adjustment is terminated. Therefore, the telescopic adjustment can be made. When the upper jacket 3 reaches the position at one end of the telescopic stroke range (lower limit adjustment position) during the telescopic adjustment, the stopper 31 abuts against the guide 724 (part of the lock mechanism 5) to restrict a further movement of the upper jacket 3.

The operation lever 52 is operated to restrict the telescopic adjustment in the state illustrated in FIG. 8. Specifically, when the operation lever 52 is operated and the bolt 51 rotates in an arrow Y2 direction, the first stopper member 71 rotates in the same direction. Through this rotation, the first protrusions 713 rotate as well. At this time, the second stopper member 72 is urged toward the first stopper member 71 with the urging force of the urging member 73. Therefore, the second stopper member 72 moves toward the first stopper member 71 while one outer surface 723a of each second protrusion 723 is sliding along each first protrusion 713. Each first protrusion 713 is eventually positioned in each recess 728 of the second stopper member 72 to achieve the state illustrated in FIG. 4.

Effects Etc.

According to this embodiment described above, the opening and closing portion 70 enters the path of the stopper 31 while the restriction of the telescopic adjustment is terminated. Therefore, the stopper 31 can securely abut against the opening and closing portion 70 during the telescopic adjustment. If the stopper 31 interferes with the opening and closing portion 70 upon secondary collision, shock energy absorption performed by the shock absorber 6 decreases. In this embodiment, the opening and closing portion 70 opens the path of the stopper 31 while the telescopic adjustment is restricted. Therefore, the stopper 31 does not interfere with the opening and closing portion 70 even though the lower jacket 4 moves upon the secondary collision. Thus, the decrease in the shock energy absorption due to the stopper 31 can be suppressed. When the decrease in the shock energy absorption can be suppressed, the absorption of the shock of the secondary collision can be controlled more easily.

The opening and closing portion 70 opens or closes the path L1 of the stopper 31 in association with the bolt 51 configured to restrict the telescopic adjustment. Therefore, the operation of restricting the telescopic adjustment and the opening or closing operation of the opening and closing portion 70 can be executed through the common rotation of the bolt 51. Thus, no dedicated power mechanism is needed for the opening or closing operation of the opening and closing portion 70. Accordingly, the number of components can be reduced, and the size can be reduced.

The opening and closing portion 70 has the stopper members 71 and 72 configured to move into contact with or away from each other along the axial direction of the bolt 51 along with the rotation of the bolt 51. Therefore, the path L1 of the stopper 31 can be opened or closed in association with the operation of moving the stopper members 71 and 72 into contact with or away from each other. That is, the path L1 of the stopper 31 can be opened or closed with a simple structure.

The urging member 73 urges the second stopper member 72 with the force in the direction in which the second stopper member 72 approaches the first stopper member 71. Therefore, the first stopper member 71 and the second stopper member 72 can be brought close to each other. Thus, the operation of opening or closing the first stopper member 71 and the second stopper member 72 can smoothly be executed in association with the rotation of the bolt 51.

While the telescopic adjustment is restricted, the groove 725 is positioned on the path L1 of the stopper 31 to open the path L1 by moving the second stopper member 72 to cause the recesses 728 of the second stopper member 72 and the first protrusions 713 of the first stopper member 71 to mesh with each other. In this state, the stopper 31 can pass through the groove 725.

While the restriction of the telescopic adjustment is terminated, the groove 725 retreats from the path L1 of the stopper 31 and the guide 724 of the second stopper member 72 enters the path L1 by moving the second stopper member 72 to cause the recesses 728 and the first protrusions 713 to move away from each other. In this state, the stopper 31 cannot pass through the groove 725.

Thus, the opening and closing operations of the opening and closing portion 70 are achieved by moving the groove 725 toward and away from the path L1 in association with the relative operations between the first protrusions 713 of the first stopper member 71 and the recesses 728 of the second stopper member 72. That is, the opening and closing operations of the opening and closing portion 70 can be achieved with a simple structure in which the groove 725 slides in the axial direction of the bolt 51.

The second stopper member 72 has the plurality of recesses 728, and the first stopper member 71 has the plurality of first protrusions 713 configured to mesh with the recesses 728. Therefore, a force is transmitted between the recesses 728 and the first protrusions 713. Thus, the relative operation between the first stopper member 71 and the second stopper member 72 can be performed stably.

Second Embodiment

The first embodiment is directed to the exemplary opening and closing portion 70 configured to open or close the path L1 by mutually rotating the first stopper member 71 and the second stopper member 72. A second embodiment is directed to an opening and closing portion 70a configured to open or close the path L1 by moving a first stopper member 71a and a second stopper member 72a into contact with or away from each other.

Structure

Figure 9:
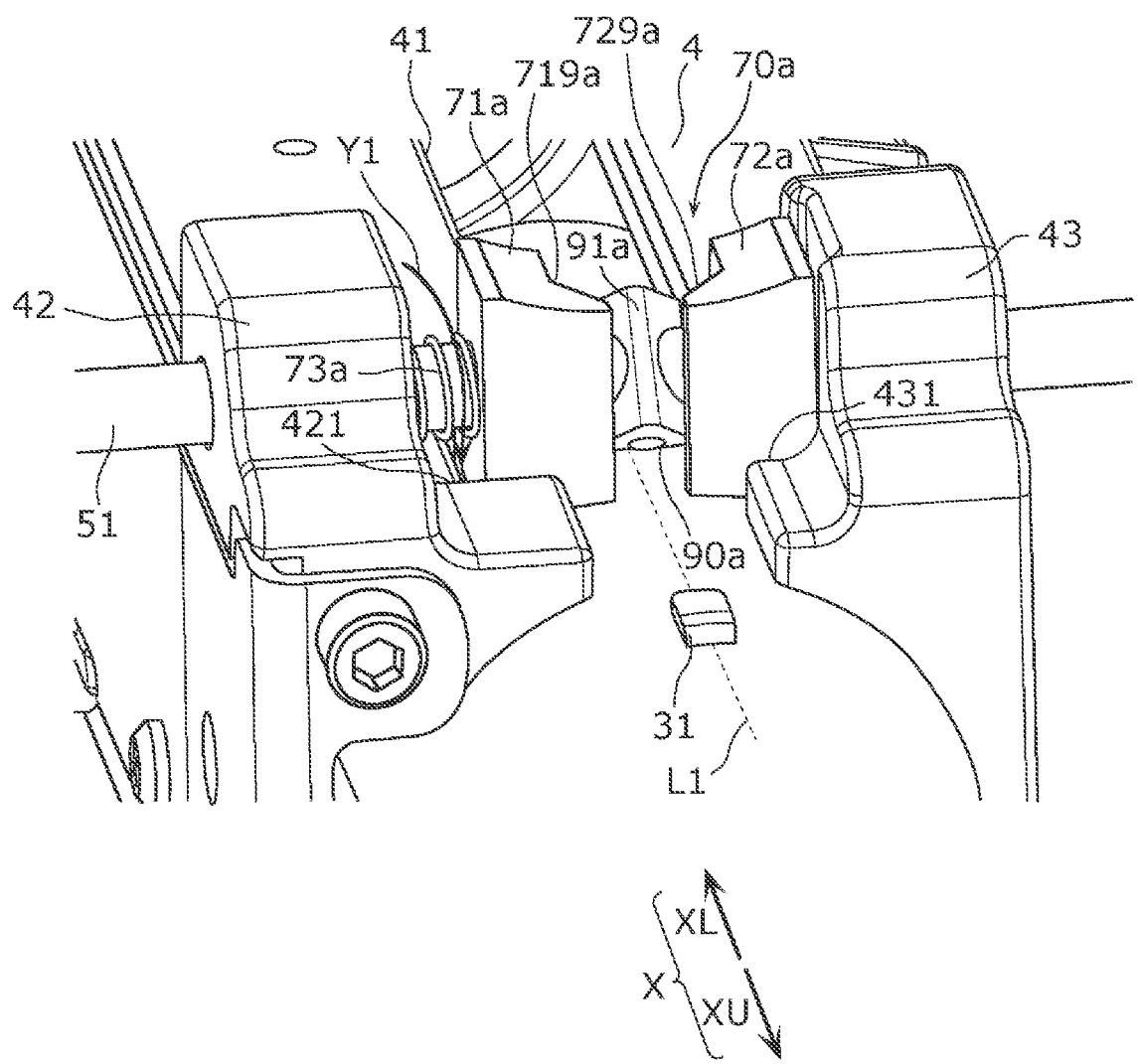
FIG. 9 is a perspective view illustrating the overall structure of an opening and closing portion according to a second embodiment.
Figure 10:
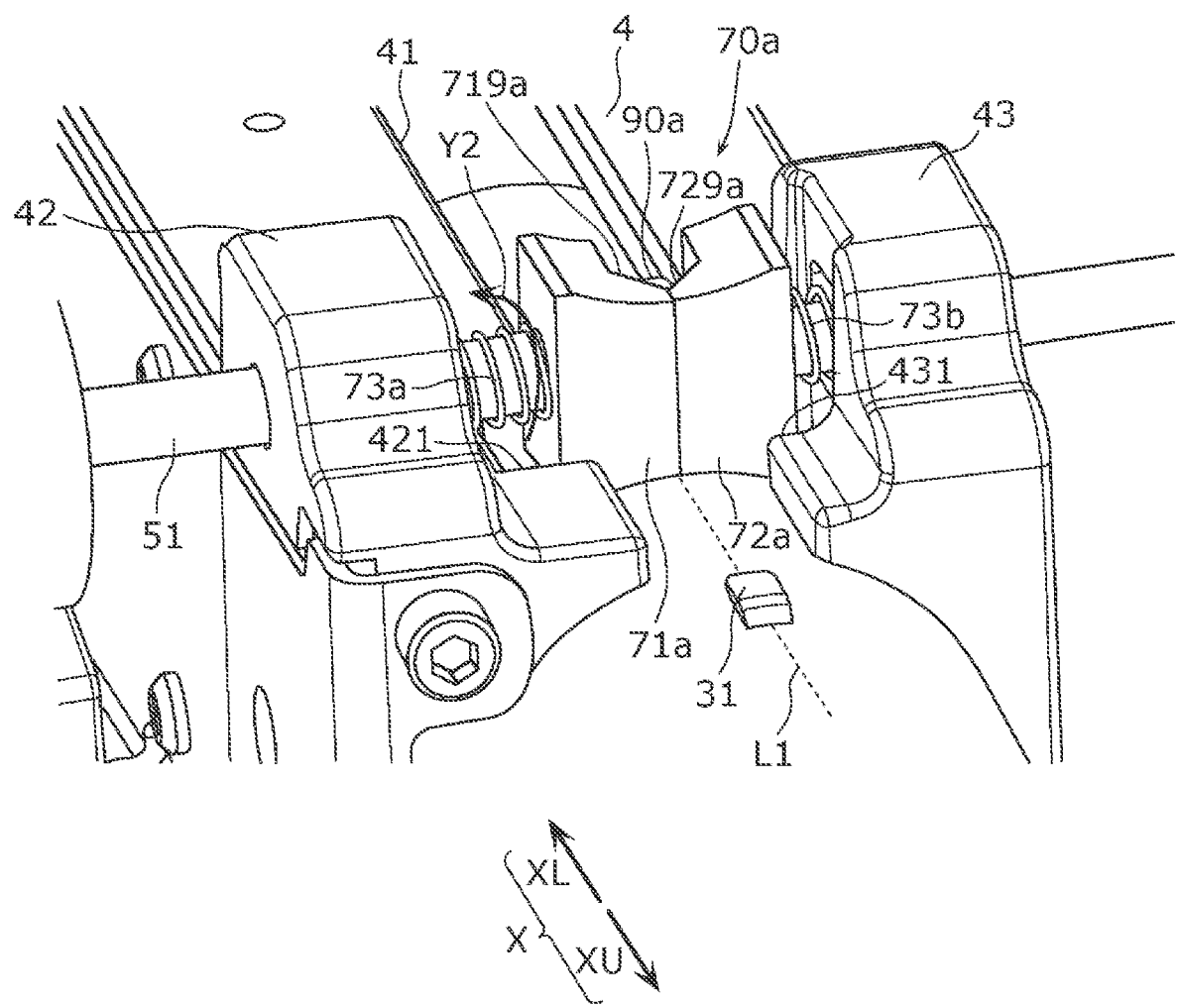
FIG. 10 is a perspective view illustrating the overall structure of the opening and closing portion according to the second embodiment.

FIG. 9 and FIG. 10 are perspective views illustrating the overall structure of the opening and closing portion 70a according to the second embodiment. FIG. 9 illustrates the opening and closing portion 70a in a state in which the telescopic adjustment is restricted. FIG. 10 illustrates the opening and closing portion 70a in a state in which the restriction of the telescopic adjustment is terminated. In the second embodiment, the same parts as those in the first embodiment are represented by the same reference symbols, and their description may be omitted.

As illustrated in FIG. 9 and FIG. 10, the opening and closing portion 70a includes the bolt 51, a pair of stopper members 71a and 72a, a pair of urging members 73a and 73b, and a drive member 90a.

The stopper members 71a and 72a are attached to the bolt 51 in a slidable manner. Of the stopper members 71a and 72a, the first stopper member 71a is a block-shaped member, and the bolt 51 extends through the center of the first stopper member 71a. The first stopper member 71a is housed in the second housing recess 421 of the shaft support 42, and is guided in the axial direction of the bolt 51 by the inner surfaces of the second housing recess 421. A first cutout 719a is formed at an end of the first stopper member 71a close to the second stopper member 72a and located on the axial direction lower side XL.

Of the stopper members 71a and 72a, the second stopper member 72a is a block-shaped member, and the bolt 51 extends through the center of the second stopper member 72a. The second stopper member 72a is housed in the first housing recess 431 of the shaft support 43, and is guided in the axial direction of the bolt 51 by the inner surfaces of the first housing recess 431. A second cutout 729a is formed at an end of the second stopper member 72a close to the first stopper member 71a and located on the axial direction lower side XL.

The urging members 73a and 73b are coil springs through which the bolt 51 is inserted. Of the urging members 73a and 73b, the first urging member 73a urges the first stopper member 71a with a force in a direction in which the first stopper member 71a approaches the second stopper member 72a. The first urging member 73a is interposed between the shaft support 42 and the first stopper member 71a, and urges the first stopper member 71a with a force in a direction in which the first stopper member 71a moves away from the shaft support 42. That is, the first stopper member 71a is urged by the first urging member 73a with the force in the direction in which the first stopper member 71a approaches the second stopper member 72a.

Of the urging members 73a and 73b, the second urging member 73b urges the second stopper member 72a with a force in a direction in which the second stopper member 72a approaches the first stopper member 71a. The second urging member 73b is interposed between the shaft support 43 and the second stopper member 72a, and urges the second stopper member 72a with a force in a direction in which the second stopper member 72a moves away from the shaft support 43. That is, the second stopper member 72a is urged by the second urging member 73b with the force in the direction in which the second stopper member 72a approaches the first stopper member 71a.

The drive member 90a is driven along with the rotation of the bolt 51 to move the first stopper member 71a and the second stopper member 72a away from each other. Specifically, the drive member 90a is a block-shaped member, and the bolt 51 extends through the center of the drive member 90a while being fitted to the drive member 90a. Therefore, the drive member 90*a* rotates in association with the rotation of the bolt 51. The drive member 90*a* is arranged between the first stopper member 71*a* and the second stopper member 72*a*. Specifically, the drive member 90*a* is arranged between the first cutout 719*a* of the first stopper member 71*a* and the second cutout 729*a* of the second stopper member 72*a*. An end 91*a* of the drive member 90*a* on the axial direction upper side XU has a tapered shape. In the state in which the telescopic adjustment is restricted as illustrated in FIG. 9, the drive member 90*a* is interposed between the first stopper member 71*a* and the second stopper member 72*a* to keep the first stopper member 71*a* and the second stopper member 72*a* away from each other. In the state in which the restriction of the telescopic adjustment is terminated as illustrated in FIG. 10, the drive member 90*a* is housed between the first cutout 719*a* of the first stopper member 71*a* and the second cutout 729*a* of the second stopper member 72*a*. In this state, the first stopper member 71*a* and the second stopper member 72*a* approach and abut against each other with the urging forces of the urging members 73*a* and 73*b*.

Operations

Next, operations of the opening and closing portion 70*a* are described. In the state in which the telescopic adjustment is restricted as illustrated in FIG. 9, the drive member 90*a* is interposed between the first stopper member 71*a* and the second stopper member 72*a* to keep the first stopper member 71*a* and the second stopper member 72*a* away from each other. At this time, both the first stopper member 71*a* and the second stopper member 72*a* retreat from the path L1 of the stopper 31 of the upper jacket 3. The drive member 90*a* also retreats from the path L1. In this state, the stopper 31 passes through a space between the first stopper member 71*a* and the second stopper member 72*a* below the drive member 90*a* even if the upper jacket 3 moves to the axial direction lower side XL to enter the lower jacket 4 in the event of secondary collision. That is, the stopper 31 does not interfere with the opening and closing portion 70*a*.

The operation lever 52 is operated to terminate the restriction of the telescopic adjustment illustrated in FIG. 9. Specifically, when the operation lever 52 is operated and the bolt 51 rotates in the arrow Y1 direction, the drive member 90*a* rotates in the same direction. Through this rotation, the drive member 90*a* gradually retreats from the space between the first stopper member 71*a* and the second stopper member 72*a*. At this time, the first stopper member 71*a* and the second stopper member 72*a* gradually approach each other with the urging forces of the urging members 73*a* and 73*b*.

When the drive member 90*a* is housed between the first cutout 719*a* of the first stopper member 71*a* and the second cutout 729*a* of the second stopper member 72*a* as illustrated in FIG. 10, the first stopper member 71*a* and the second stopper member 72*a* eventually abut against each other. In this state, the first stopper member 71*a* and the second stopper member 72*a* close the path L1. In this state, the restriction of the telescopic adjustment is terminated. Therefore, the telescopic adjustment can be made. When the upper jacket 3 reaches the position at one end of the telescopic stroke range (lower limit adjustment position) during the telescopic adjustment, the stopper 31 abuts against at least one of the first stopper member 71*a* and the second stopper member 72*a* to restrict a further movement of the upper jacket 3.

The operation lever 52 is operated to restrict the telescopic adjustment in the state illustrated in FIG. 10. Specifically, when the operation lever 52 is operated and the bolt 51 rotates in the arrow Y2 direction, the drive member 90*a* rotates in the same direction. Through this rotation, the end 91*a* of the drive member 90*a* enters the space between the first stopper member 71*a* and the second stopper member 72*a*. Since the end 91*a* of the drive member 90*a* has the tapered shape, the end 91*a* gradually expands the space between the first stopper member 71*a* and the second stopper member 72*a* along with the rotation to eventually achieve the state illustrated in FIG. 9.

Effects Etc.

As described above, the drive member 90*a* is driven along with the rotation of the bolt 51 to move the first stopper member 71*a* and the second stopper member 72*a* away from each other. Therefore, the opening operation of the opening and closing portion 70*a* can easily be achieved based on the rotation of the bolt 51.

Description is given of the exemplary case where the drive member 90*a* rotates along with the rotation of the bolt 51, but the drive member 90*a* may be driven in any way along with the rotation of the bolt 51 as long as the first stopper member 71*a* and the second stopper member 72*a* move away from each other.

Others

The present disclosure is not limited to the embodiments described above, and various modifications may be made within the scope of claims.

For example, the first embodiment is directed to the exemplary case where the first stopper member 71 is fixed to the bolt 51 and the second stopper member 72 is attached to the bolt 51 in a slidable manner. The first stopper member 71 and the second stopper member 72 may be attached to the bolt 51 in a slidable manner. That is, both the first stopper member 71 and the second stopper member 72 can be moved to switch the restriction of the telescopic adjustment and the termination of the restriction. In this case, an urging member may be provided between the first stopper member 71 and the shaft support 42 to urge the first stopper member 71 with a force in a direction in which the first stopper member 71 moves away from the shaft support 42.

The first and second embodiments are directed to the exemplary case where the opening and closing portion 70 or 70*a* opens or closes the path L1 of the stopper 31 in association with the bolt 51 configured to restrict the telescopic adjustment. A dedicated power mechanism may be provided for the opening or closing operation of the opening and closing portion.

The present disclosure encompasses embodiments attained by various modifications conceivable by persons skilled in the art to the embodiments, and embodiments attained by arbitrarily combining the constituent elements and functions of the embodiments and the modified examples without departing from the spirit of the present disclosure.

What is claimed is:

1. A steering system comprising:
   an upper jacket connected to a steering member at one end in a column axis direction, the upper jacket including a stopper having a protruding shape protruding from an outer peripheral surface of the upper jacket, and the stopper being configured to regulate a position of the upper jacket at one end of a telescopic stroke range;
   a lower jacket externally fitted to the other end of the upper jacket in the column axis direction in a slidable manner;
   a support fixed to a vehicle body and supporting the lower jacket;
   a lock mechanism configured to switch between restriction of a telescopic adjustment of the upper jacket relative to the lower jacket and termination of the restriction, the lock mechanism including an opening and closing portion configured to enter a path of the stopper when the restriction of the telescopic adjustment is terminated, and the opening and closing portion being configured to open the path of the stopper when the telescopic adjustment is restricted; and a shock absorber configured to absorb a shock when the upper jacket moves relative to the lower jacket upon a secondary collision.

2. The steering system according to claim 1, wherein:
the lock mechanism includes a bolt configured to tighten the lower jacket into close contact with the upper jacket to restrict the telescopic adjustment; and
the opening and closing portion is configured to open and close in association with the bolt.

3. The steering system according to claim 2, wherein the opening and closing portion includes a pair of stopper members configured to move into contact with or away from each other along an axial direction of the bolt along with rotation of the bolt.

4. The steering system according to claim 3, wherein the opening and closing portion includes an urging member configured to urge at least one of the pair of stopper members in a direction toward the other stopper member.

5. The steering system according to claim 4, wherein:
a first of the pair of stopper members has a recess;
a second of the pair of stopper members has a protrusion configured to mesh with the recess, and a groove extending along the column axis direction;
when the telescopic adjustment is restricted, the groove is positioned on the path of the stopper to open the path by moving at least one of the first stopper member and the second stopper member to cause the recess and the protrusion to mesh with each other; and
when the restriction of the telescopic adjustment is terminated, the groove retreats from the path of the stopper and a part of the second stopper member enters the path by moving the at least one of the first stopper member and the second stopper member to cause the recess and the protrusion to move away from each other.

6. The steering system according to claim 4, wherein the opening and closing portion includes a drive member configured to be driven along with the rotation of the bolt to move the stopper members away from each other.

7. The steering system according to claim 3, wherein:
a first of the pair of stopper members has a recess;
a second of the pair of stopper members has a protrusion configured to mesh with the recess, and a groove extending along the column axis direction;
when the telescopic adjustment is restricted, the groove is positioned on the path of the stopper to open the path by moving at least one of the first stopper member and the second stopper member to cause the recess and the protrusion to mesh with each other; and
when the restriction of the telescopic adjustment is terminated, the groove retreats from the path of the stopper and a part of the second stopper member enters the path by moving the at least one of the first stopper member and the second stopper member to cause the recess and the protrusion to move away from each other.

* * * * *